(12) United States Patent
Porter et al.

(10) Patent No.: US 11,867,626 B2
(45) Date of Patent: Jan. 9, 2024

(54) COMPLEX SPATIALLY-RESOLVED REFLECTOMETRY/REFRACTOMETRY

(71) Applicant: The Regents of the University of Colorado, Denver, CO (US)

(72) Inventors: Christina Porter, Superior, CO (US); Daniel E. Adams, Thornton, CO (US); Michael Tanksalvala, Longmont, CO (US); Elisabeth Shanblatt, Boulder, CO (US); Margaret M. Murnane, Boulder, CO (US); Henry C. Kapteyn, Boulder, CO (US)

(73) Assignee: Regents of the Univ of Colorado, a body corporate, Denver, CO (US)

( * ) Notice: Subject to any disclaimer, the term of this patent is extended or adjusted under 35 U.S.C. 154(b) by 0 days.

(21) Appl. No.: 17/228,178

(22) Filed: Apr. 12, 2021

(65) Prior Publication Data
US 2021/0325301 A1 Oct. 21, 2021

Related U.S. Application Data

(63) Continuation of application No. 16/303,059, filed as application No. PCT/US2017/033404 on May 18, 2017, now abandoned.
(Continued)

(51) Int. Cl.
*G01N 21/47* (2006.01)
*G01N 21/45* (2006.01)
(Continued)

(52) U.S. Cl.
CPC ......... *G01N 21/4788* (2013.01); *G01N 21/33* (2013.01); *G01N 21/45* (2013.01);
(Continued)

(58) Field of Classification Search
CPC ... G01N 21/33; G01N 21/45; G01N 2021/335
See application file for complete search history.

(56) References Cited

U.S. PATENT DOCUMENTS 7,026,626 B2 * 4/2006 Harrison ............... G01J 3/2803
250/372
7,067,818 B2 * 6/2006 Harrison ............... G01N 21/55
250/372
(Continued)

*Primary Examiner* — David P Porta
*Assistant Examiner* — Djura Malevic
(74) *Attorney, Agent, or Firm* — Macheledt Bales LLP; Jennifer L. Bales

(57) ABSTRACT

Apparatus and methods for complex imaging reflectometry and refractometry using at least partially coherent light. Quantitative images yield spatially-dependent, local material information about a sample of interest. These images may provide material properties such as chemical composition, the thickness of chemical layers, dopant concentrations, mixing between layers of a sample, reactions at interfaces, etc. An incident beam of VUV wavelength or shorter is scattered off of a sample and imaged at various angles, wavelengths, and/or polarizations. The power of beam is also measured. This data is used to obtain images of a sample's absolute, spatially varying, complex reflectance or transmittance, which is then used to determine spatially-resolved, depth-dependent sample material properties.

18 Claims, 4 Drawing Sheets

Related U.S. Application Data

(60) Provisional application No. 62/338,961, filed on May 19, 2016.

(51) Int. Cl.
  *G01N 21/956* (2006.01)
  *G01N 21/33* (2006.01)
  *G01N 21/17* (2006.01)

(52) U.S. Cl.
  CPC ....... *G01N 21/4795* (2013.01); *G01N 21/956* (2013.01); *G01N 2021/1782* (2013.01); *G01N 2021/335* (2013.01); *G01N 2021/4711* (2013.01); *G01N 2201/061* (2013.01)

(56) References Cited

U.S. PATENT DOCUMENTS

| | | | | |
|---|---|---|---|---|
| 7,126,131 B2* | 10/2006 | Harrison | ............... | G01N 21/274 250/372 |
| 7,394,551 B2* | 7/2008 | Harrison | ................ | G01N 21/33 356/504 |
| 9,360,768 B2* | 6/2016 | Bottiglieri | ........... | G03F 7/70633 |
| 9,541,500 B2* | 1/2017 | Tsai | ..................... | G01N 21/956 |
| 9,766,552 B2* | 9/2017 | Van Beurden | ...... | G03F 7/70633 |
| 9,772,562 B2* | 9/2017 | Mink | ................. | G03F 7/70625 |
| 9,939,250 B2* | 4/2018 | Pisarenco | ........... | G03F 7/70633 |
| 9,952,518 B2* | 4/2018 | Den Boef | ............ | G01N 21/956 |
| 10,036,962 B2* | 7/2018 | Quintanilha | ........... | G01B 11/06 |
| 10,126,659 B2* | 11/2018 | Zijp | .................... | G03F 7/70133 |
| 10,146,140 B2* | 12/2018 | Pisarenco | ............... | G03F 7/705 |
| 10,417,359 B2* | 9/2019 | Socha | .................... | G06F 17/18 |
| 10,649,345 B2* | 5/2020 | Pisarenco | ......... | G01N 21/4788 |
| 2004/0169863 A1* | 9/2004 | Kawate | ................. | G01N 21/55 356/432 |
| 2005/0001172 A1* | 1/2005 | Harrison | ................ | G01N 21/55 250/372 |
| 2010/0284027 A1* | 11/2010 | Scheiner | ................ | G01B 11/08 356/626 |
| 2011/0098992 A1* | 4/2011 | Van Beurden | .......... | G03F 7/705 703/2 |
| 2012/0123748 A1* | 5/2012 | Aben | .................. | G03F 7/70491 703/2 |
| 2012/0243004 A1* | 9/2012 | El Gawhary | .......... | G01B 11/24 356/601 |
| 2012/0330592 A1* | 12/2012 | Bottiglieri | ........... | G03F 7/70633 702/85 |
| 2013/0035911 A1* | 2/2013 | Pisarenco | ........... | G03F 7/70633 703/2 |
| 2013/0066597 A1* | 3/2013 | Van Beurden | .......... | G06F 17/11 702/81 |
| 2013/0073070 A1* | 3/2013 | Tsai | ...................... | G01N 21/47 700/103 |
| 2013/0144560 A1* | 6/2013 | Pisarenco | .............. | G01N 21/47 702/189 |
| 2014/0213909 A1* | 7/2014 | Mestha | ................ | A61B 5/0077 600/476 |
| 2015/0246415 A1* | 9/2015 | Hosseini | ................ | B23K 26/53 65/102 |
| 2016/0011523 A1* | 1/2016 | Singh | .................. | G03F 7/70633 355/77 |
| 2016/0187849 A1* | 6/2016 | Zhang | ...................... | G21K 7/00 348/41 |
| 2016/0223916 A1* | 8/2016 | Van Beurden | ...... | G03F 7/70483 |
| 2016/0273906 A1* | 9/2016 | Pisarenco | ............. | G01B 11/02 |
| 2016/0313653 A1* | 10/2016 | Mink | .................. | G03F 7/70633 |
| 2016/0320711 A1* | 11/2016 | Quintanilha | ........... | G01B 11/06 |
| 2016/0320712 A1* | 11/2016 | Den Boef | ........... | G03F 7/70616 |
| 2017/0102620 A1* | 4/2017 | Zijp | .................... | G03F 7/70133 |
| 2017/0177760 A1* | 6/2017 | Socha | ...................... | G06F 17/18 |
| 2018/0011014 A1* | 1/2018 | Setija | ................. | G01N 21/4788 |
| 2018/0088040 A1* | 3/2018 | Krishnan | .............. | G01J 3/2803 |
| 2018/0100814 A1* | 4/2018 | Zhang | ...................... | G03F 1/84 |
| 2018/0120714 A1* | 5/2018 | Zijp | .................... | G03F 7/70591 |

\* cited by examiner

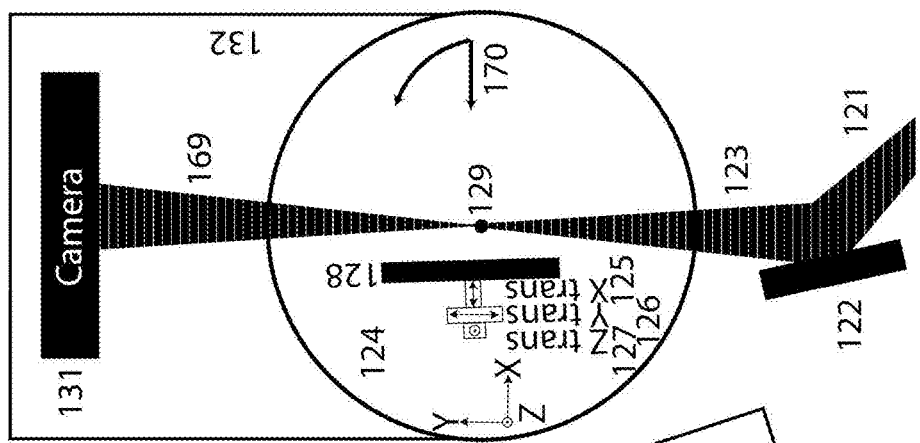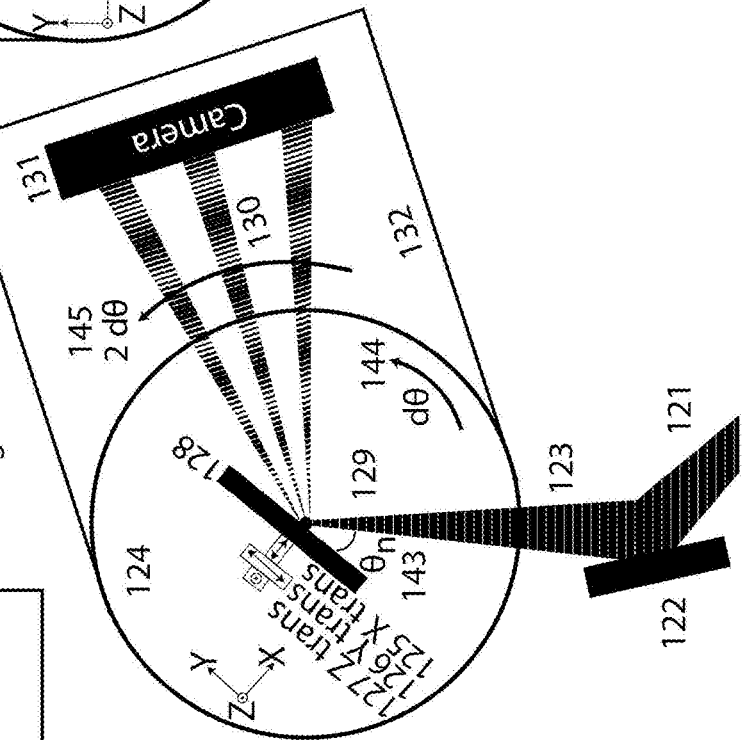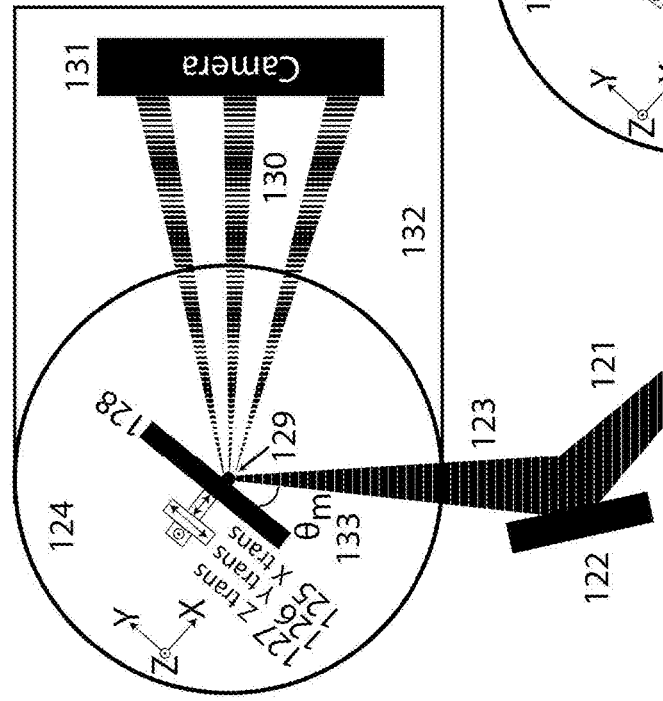

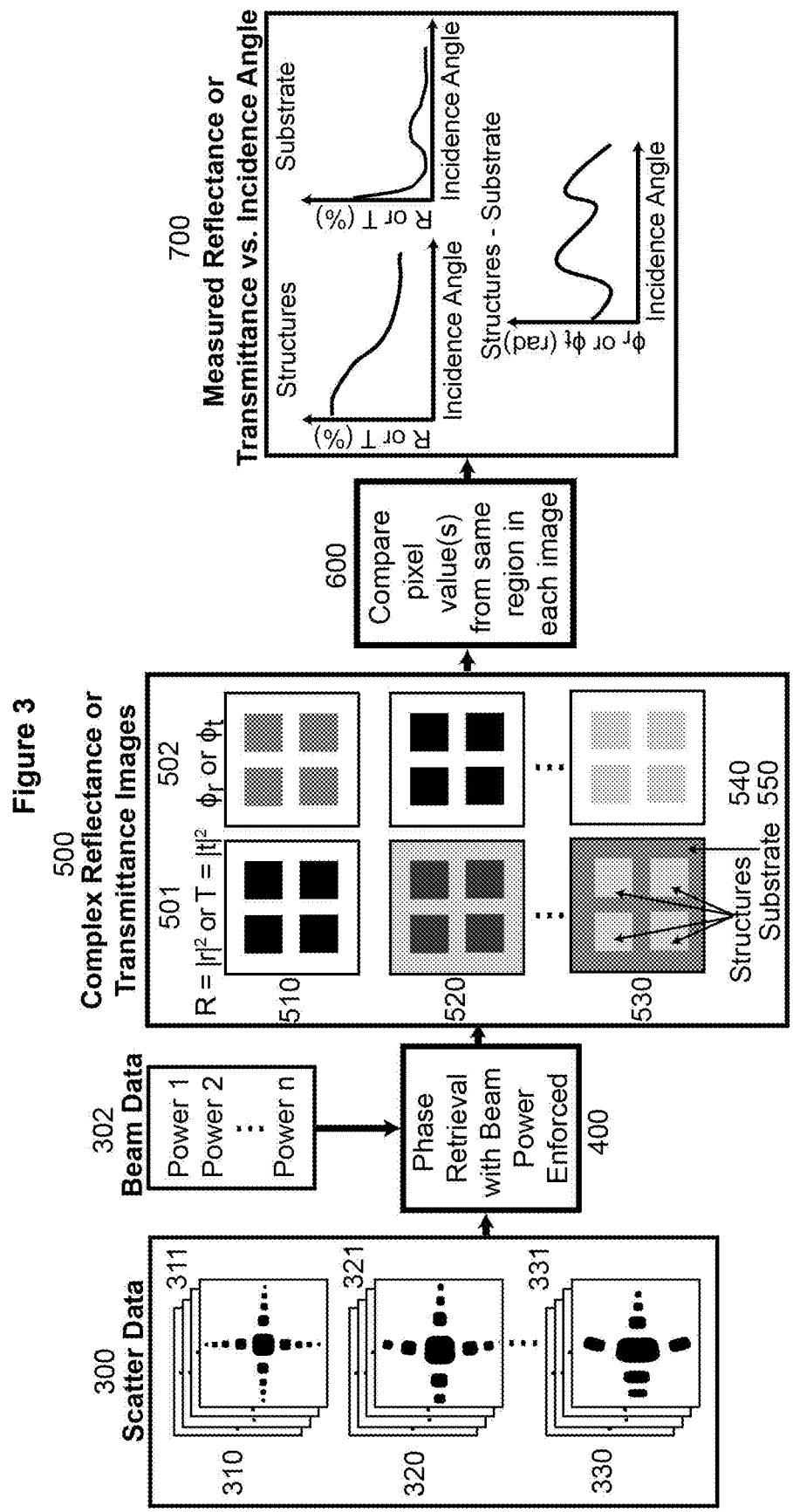

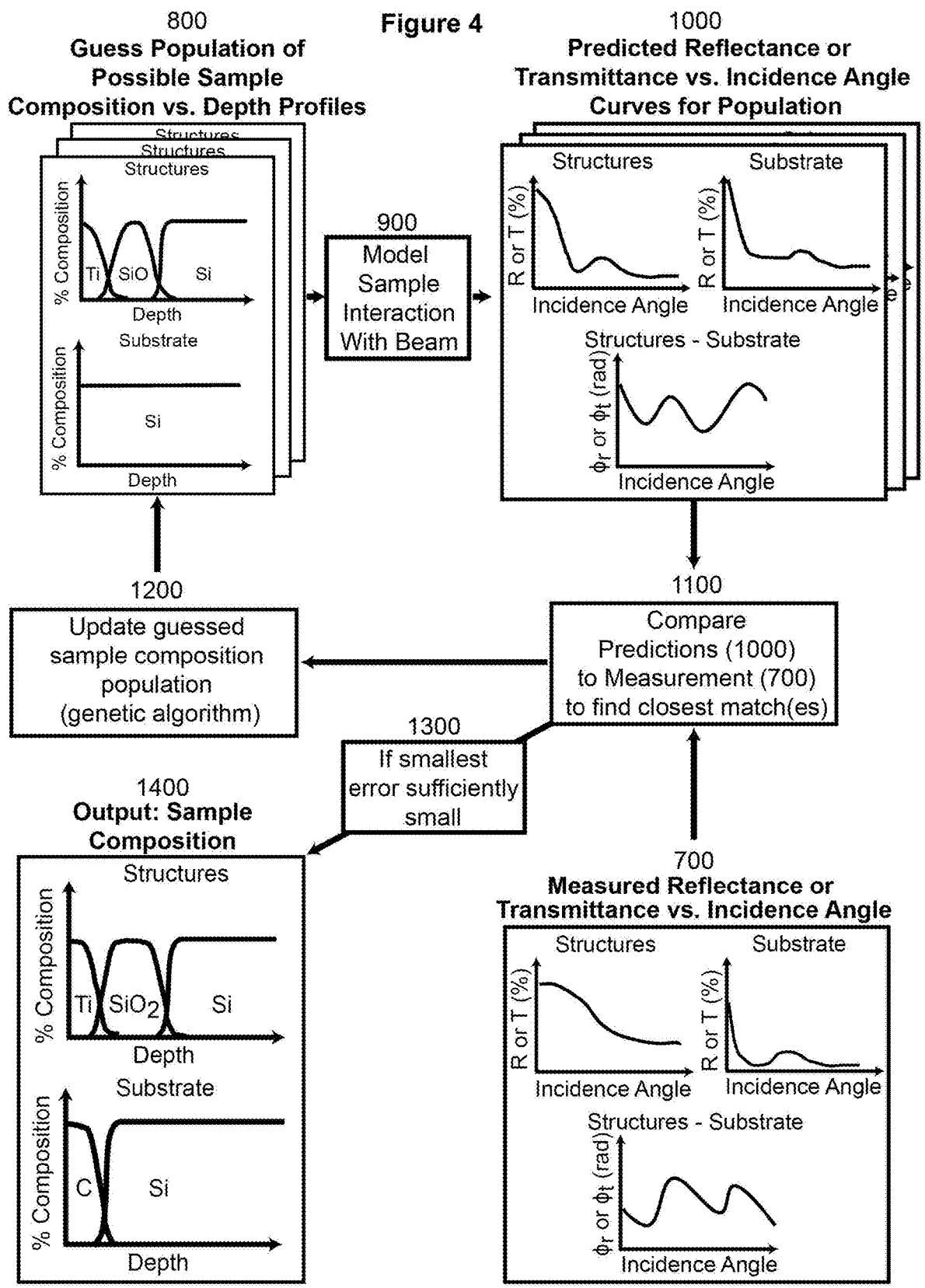

COMPLEX SPATIALLY-RESOLVED REFLECTOMETRY/REFRACTOMETRY

This invention was made with government support under grant number W31P4Q-13-1-0015 awarded by DARPA. The government has certain rights in the invention.

FIELD OF THE INVENTION

The field of the present invention is high-resolution, quantitative imaging that can elucidate the depth-dependent composition of samples. In particular, high resolution and high composition sensitivity are achieved by using sub-VUV wavelengths to perform complex imaging reflectometry or refractometry.

BACKGROUND OF THE INVENTION

Prior art in the field (US20160187849A1) has described how to perform coherent diffraction imaging with arbitrary angle of incidence, at high numerical aperture, allowing for high resolution images to be collected in transmission or reflection at any incidence angle of the illuminating beam.

Prior art in the field has described imaging reflectometers. U.S. Pat. No. 7,067,818 B2 describes an imaging reflectometer at sub-VUV wavelengths that uses a spectrometer to obtain properties similar to those described here. The technique described in this patent does not require the use of a spectrometer, however, making it more general and more easily applied. The current patent represents the first complex imaging reflectometer to our knowledge, where both an amplitude and phase image of an object are obtained.

Prior art in the field (for example, Nature Communications 4, (2013), pp. 1669-1675 and Optics Express 24, (2016), pp. 18745-18754) has used multiple wavelengths to determine spatially-dependent material properties of samples. In works such as these, the absolute reflectance or transmittance of the sample is not measured (that is to say, only relative reflectivities or transmissivities are measured). Further, there is no determination of the depth-dependent material properties of the sample. Finally, such works typically rely upon using wavelengths that fall at an absorption edge of the sample, which the method and apparatus presented here do not. Thus, this patent is more broadly applicable to determining the material properties of a wider variety of samples.

Quantitative imaging techniques are those that extract spatially-dependent material properties of samples, typically using well-understood, specific contrast mechanisms that depend on material properties of interest. Such techniques typically elucidate the composition of a sample in addition to its morphology, and are capable of separating these measurements.

Reflectometry is the use of reflected waves from surfaces to characterize objects. Refractometry is the use of transmitted waves through an object to characterize it. If such a technique results in measurements of an object's spatially-resolved characteristics, then it is called imaging reflectometry or refractometry. Furthermore, if these images are complex-valued (that is, if an object's amplitude and phase are measured), then the technique is referred to as complex imaging reflectometry or refractometry. In this patent, "scattered light" is defined as light that has interacted with a sample. This includes diffracted and refracted light collected in either a transmission or reflection geometry.

In this patent, "complex reflectance" or "complex transmittance" refers to complex-values that may be decomposed as $r=R \exp(i \varphi_r)$ or $t=T \exp(i \varphi_t)$. The absolute value of the reflectance, R, is called the reflectivity. Similarly, the absolute value of the transmittance, T, is called the transmissivity. Both reflectivity and transmissivity take on a value between 0 and 100%, and describe the percent of the incident power that would be measured on a detector after a beam is reflected from or transmitted through a sample. The phase, $\varphi_r$ or $\varphi_t$ is the phase shift that a reflected or refracted wave from the sample would have with respect to the incoming beam. In this patent, the term complex scattering properties refers to either the complex reflectance or complex transmittance or, in some cases, both.

Coherent diffractive imaging (CDI) is a microscopy technique that may be performed either in transmission or reflection geometries. In either case, a loosely focused, partially to fully coherent beam illuminates a sample and scattered light is recorded on an array detector (camera), with no lens or other optic required in between the sample and the camera. The camera records one or many scatter patterns related in a known way to the light leaving the sample. A computer algorithm, or "phase retrieval algorithm", may be used to retrieve the amplitude and phase of the light leaving the sample from these scatter patterns. In single diffraction pattern CDI, one diffraction pattern is recorded at one sample position. In ptychography CDI, the sample is area-by-area translated with overlap between scan positions. Multiple diffraction patterns are recorded with redundant information existing in the dataset. This redundant dataset allows for robust reconstruction of both the sample and the illumination separately, with a complex image being retrieved for each.

Short wavelength illumination (vacuum ultraviolet through soft x-ray) is useful for producing high resolution images within the diffraction limit of light. In recent years, it has been paired successfully with lensless imaging techniques such as coherent diffraction imaging, scanning point microscopy and holography to yield amplitude and phase contrast images of samples with ultrahigh resolution. In particular, extreme ultraviolet light (with a wavelength of 10-100 nm) has proved useful because images obtained using these wavelengths show significant amplitude and phase contrast for many samples, due to a multiplicity of absorption edges falling in this spectral region. In this patent, "beam" or "illumination" is used to mean light, electrons, neutrons, or other radiation that will scatter from a sample.

Holography is an alternative method for obtaining complex images of samples in which a reference wave is interfered with light scattering from a sample. For the purposes of this patent, "phase retrieval" shall include holographic techniques capable of separating the sample from the illumination. Furthermore, complex images of a sample's reflectance or transmittance could instead be acquired by performing interferometric, point-by-point scanning microscopy in a transmission (STXM) or reflection (SRXM) geometry. In such an interferometric STXM/SRXM measurement, the scattered beam would be interfered with a known reference. Thus, the scatter data discussed in this patent may consist of holographic datasets, coherent diffraction imaging datasets, or interferometric scanning point microscopy measurements. The preferred embodiment will focus on the use of ptychographic coherent diffraction imaging data, but an expert in the field will understand that any imaging technique that can yield complex reflectance or transmittance images are alternative embodiments of this patent.

SUMMARY

It is an object of the present invention to provide complex, spatially-resolved reflectometry and refractometry via quantitative microscopy techniques using at least partially coherent light. Quantitative images yield spatially-dependent, local material information about a sample of interest. These images may provide material properties such as chemical composition, the thickness of chemical layers, dopant concentrations, mixing between layers of a sample, reactions at interfaces, etc. Preferred embodiments relate to coherent diffraction imaging, holography, or interferometric scanning point microscopy as applied using short-wavelength deep-ultraviolet (DUV), vacuum ultraviolet (VUV), extreme ultraviolet (EUV), or soft x-ray light sources. These techniques are used to obtain images of a sample's absolute, spatially varying, complex reflectance or transmittance, which may be used to determine spatially-resolved, depth-dependent sample material properties.

Most coherent diffraction imaging to date has not been quantitative. Intensity images of reconstructed objects have yielded relative reflectivity or transmissivity values between different pixels, but with no absolute normalization. The present invention provides a method to obtain absolute, complex reflectance or transmittance images from coherent diffraction imaging—which could alternatively be replaced with various holographic or interferometric scanning-point microscopy techniques—and use these images to determine material properties of a sample. Scatter data from an illumination source interacting with a sample is recorded on a detector in either a reflection or transmission geometry. Then, any phase retrieval algorithm or other interferometric method that can separate the illumination from the object to yield complex reflectance or transmittance images of the sample may be used. When using coherent diffraction imaging, if the reconstructed illumination is normalized to a measurement of the illumination's power, then absolute reflectance or transmittance images may naturally be obtained.

Furthermore, multiple complex images of the sample are collected, each with a varying "independent parameter". This independent parameter could be the beam's incidence angle (the focus of the preferred embodiment), polarization, or wavelength. The resulting complex reflectance/transmittance vs. independent parameter (angle/wavelength/polarization) curves for each pixel in the image, or for groups of pixels known to share very similar composition, may then be used to determine spatially-resolved, depth dependent material properties for multiple regions of the sample.

These properties include chemical composition, density, interfacial mixing, dopant concentrations, surface roughness and layer thicknesses. The use of both the reflectivity or transmissivity and phase of a sample for determining material properties makes this a powerful technique that has significantly more sensitivity than the use of the amplitude alone in traditional imaging reflectometry.

A preferred method according to the present invention determines spatially-resolved, material properties from a sample's complex reflectance or transmittance by providing at least partially spatially-coherent radiation in the form of an incident beam, characterizing the incident beam (for example by measuring its power), delivering the incident beam onto a sample to produce scattered radiation, varying at least one independent parameter of the incident beam upon which the sample's complex reflectance or transmittance is dependent, collecting the scattered radiation at multiple values of the independent parameter on a detector and generating scatter data, calculating spatially-resolved, complex scattering properties of the sample based upon the beam characterization and the scatter data and determining spatially-resolved, depth-dependent material properties of the sample from the spatially-resolved complex scattering properties. An iterative method of determining the depth-dependent properties is especially useful. In this case, the method includes the step of guessing at least one sample model in which spatially-resolved material properties are assigned a depth (e.g. dopant density, material density, material composition, surface roughness, or interfacial mixing of interfaces between layers). Then, the method estimates predicted reflectance/transmittance versus the independent parameter based on the sample model, compares the predicted reflectance/transmittance versus the independent parameter to a measurement of reflectance/transmittance versus the independent parameter, and refines the sample model until the predicted reflectance/transmittance versus the independent parameter substantially agrees with the measured reflectance/transmittance versus the independent parameter. A genetic algorithm is useful here.

The method may use either the amplitude or phase of the complex scattering properties to determine material properties. Vacuum ultraviolet (VUV) or shorter wavelength light may be used for the incident beam, for example by generating the light via high harmonic generation.

The incident beam may provide multiple illuminating wavelengths simultaneously incident on the sample, provide multiple illuminating wavelengths in sequence incident on the sample, provide multiple polarization states of the incident beam, or provide multiple spatial modes of the incident beam. Then the independent parameter might be illumination wavelength, relative incidence angle between the beam and the sample, or illumination polarization.

In some cases it is useful to move the sample relative to the incident beam and collect the scattered radiation for multiple values of the independent parameter. The camera may be moved with respect to the scattered radiation to extend the resolution of the imaging system between variations of the independent parameter.

If the beam is characterized by measuring beam power, this may be done repeatedly during the process, either by removing the sample from the path of the beam or by scattering the beam off of a portion of the sample having known properties.

This method may use a ptychographic reconstruction algorithm.

Apparatus according to the present invention for measuring spatially-resolved material properties of a sample includes an optic that focuses an incident beam of light composed of wavelengths at or below the vacuum ultraviolet onto the sample, a detector configured to collect light that scatters from the sample and generate scatter data, a device configured to measure power of the incident beam, and a processor configured to convert scatter data and measured power of the incident beam into spatially-resolved, complex scattering properties of the sample, and determine spatially-resolved material properties of the sample from the spatially-resolved complex scattering properties. It may include an optic to divert a portion of the beam to the detector, a mechanism configured to rotate the sample relative to the incident beam, a mechanism configured to translate the sample relative to the incident beam, a mechanism configured to rotate the detector relative to the sample a mechanism for selectively removing the sample from a path of the beam between the optic and the array detector, or a mechanism to alter the wavelength of the illumination on the sample.

BRIEF DESCRIPTION OF THE DRAWINGS

FIGS. 1A-1C are schematic, top-down views of a complex imaging reflectometer in various configurations according to the present invention. FIG. 1A shows a configuration that would be suitable for an independent parameter that is the beam wavelength or polarization. FIG. 1B shows a configuration of a reflectometer where the independent parameter is beam incidence angle. FIG. 1C shows a suitable configuration of the reflectometer for obtaining beam data.

FIG. 2A shows a configuration that would be suitable for an independent parameter that is the beam wavelength or polarization. FIG. 2B shows a configuration of a refractometer where the independent parameter is beam incidence angle. FIG. 2C shows a suitable configuration of the refractometer for obtaining beam data.

FIG. 3 is a flow diagram illustrating the process of obtaining complex reflectance or transmittance vs. incidence angle (or other independent parameter) curves from spatially resolved areas of a sample, using data collected via complex imaging reflectometry or refractometry as shown in FIGS. 1A-C and FIGS. 2A-C.

FIG. 4 is a flow diagram illustrating the process of obtaining spatially resolved sample composition information from the complex reflectivity or transmissivity measurements obtained as shown in FIG. 3.

DETAILED DESCRIPTION OF THE PREFERRED EMBODIMENT

Figure 2A:
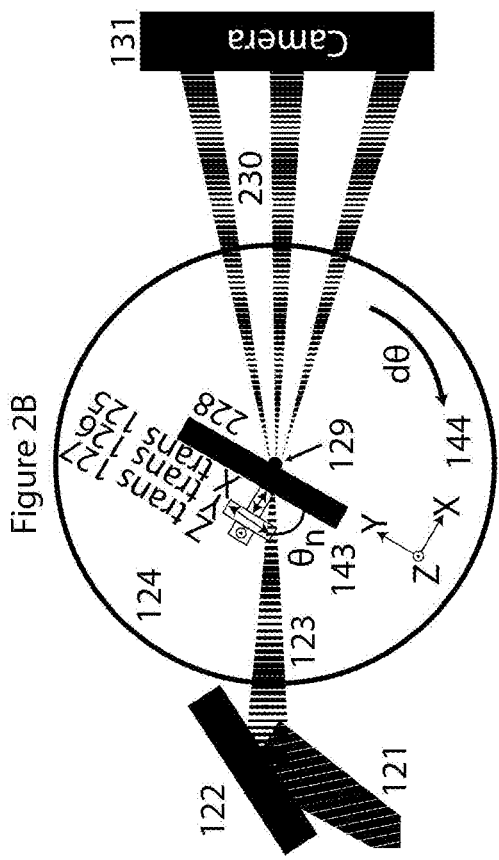
FIGS. 2A-C are schematic, top-down views of a complex imaging refractometer in various configurations according to the present invention.

This patent is concerned with a work flow that includes the collection of scattered radiation measurements from a sample, the use of these measurements to determine the complex, spatially-resolved, absolute reflectance or transmittance of the sample in an area of interest, for the ultimate deduction of spatially-resolved material properties of the sample.

The preferred embodiment of this invention is an instrument that measures a spatially-resolved image where each pixel yields the complex, absolute reflectance or transmittance (including both amplitude and phase) of a sample from a dataset consisting of scatter data due to a sub-VUV wavelength illumination beam incident on a sample.

The instrument collects diffraction data from an at least partially reflective sample 128 or at least partially transmissive sample 228 at for a multiplicity of values of an independent parameter (multiple incidence angles, wavelengths, or polarizations). For each value of the independent parameter(s) (310, 320, 330), scatter data from multiple translations between the illumination and sample (311, 321, 331) may be collected. A complex-valued image 500 is reconstructed 400 for each value of the independent parameter(s).

FIGS. 1A-1C are schematic, top-down views of a complex imaging reflectometer in various configurations according to the present invention. The independent parameter for which these schematics are shown is beam incidence angle. Note that the apparatus in FIGS. 1A-C and FIGS. 2A-C is the same for convenience, but not all of the elements will be required in every embodiment. For example, the configurations of FIG. 2A-C may not require the sample rotation stage 124 if the independent parameter is not beam incidence angle. Translation stages 125-127 may or may not be used, but are consistent with a reflectometer wherein scatter patterns for multiple relative translations between the beam and the sample are collected for each value of the independent parameter(s).

FIG. 1A shows a complex imaging reflectometer in a first data collection geometry for light incident on a sample at initial angle θm (133). A beam of partially to fully coherent radiation 121 is incident onto a focusing optic 122 and focused as incident beam 123 onto a reflective sample 128 at initial incident angle 133. Sample 128 sits atop Z (127) and Y (126) translation stages that allow the beam's focus to be incident at different relative translations on the sample's surface. Sample 128, Z stage 127, and Y stage 128 sit atop X translation stage 125 that allows the sample's face to be aligned with the axis of rotation 129 of sample rotation stage 124 below. Scattered light 130 from sample 128 forms scatter data 300 (see FIG. 3) collected via camera 131 which sits atop camera rotation stage 132, which rotates camera 131 about axis of rotation 129. Sample stage 124 is rotated in order to record scatter data on camera 131 at a multiplicity of incidence angles of beam 123, as shown in FIG. 1B.

FIG. 1B shows a complex spatially-resolved reflectometer configured for collection of scattered light at a variable incidence angle $\theta_n$ (144). Sample 128 is rotated by angle dθ (144). Camera 131 is rotated about axis of rotation 129 by an angle 2 dθ (145) such that the specular reflection 130 from the sample remains centered on camera 131. Thus, $\theta_n = \theta_m + d\theta$.

Scatter data from multiple translations using Y stage 126 and Z stage 127 may be recorded at each value of the independent parameter (here, incidence angles 144). Not shown, a rotation stage with axis of rotation being the X axis could be added between Z stage 127 and sample 128, or in lieu of the Z and Y stages such that multiple relative rotations between the sample and the beam could replace or add to the multiple translations recorded at every value of the independent parameter. Scatter data is collected for many values of the independent parameter (incidence angles 144, in FIG. 1B) in this manner.

FIG. 1C shows a configuration for collecting incident beam 123 data, in particular beam power and optionally shape on the detector. Either before, after, or before and after scatter data 130 has been collected at many incidence angles 144 and possibly sample translations, beam data is acquired as shown in FIG. 1C. Sample 128 is rotated as shown by arrows 170 such that its face is parallel to incoming beam 123. Sample 128 is then translated using X translation stage 125 such that it does not intersect focusing beam 163 or defocusing beam 169. Camera 131 is rotated using rotation stage 132 such that its face is perpendicular to defocusing beam 169. One or more images of the beam are acquired in this geometry. Beam data may be collected between collecting images of scattered light 130 at varying angles 144. Alternatively, the beam may be sampled and monitored simultaneously during scatter data acquisition (for example using a beamsplitter and photodiode or second camera placed before 121, not shown). Beam images are summed after background subtraction to yield the power of the beam. The beam shape recorded in the beam images may also be used to improve the reconstruction quality, as described in the Modulus Enforced Probe patent.

Figure 2B:
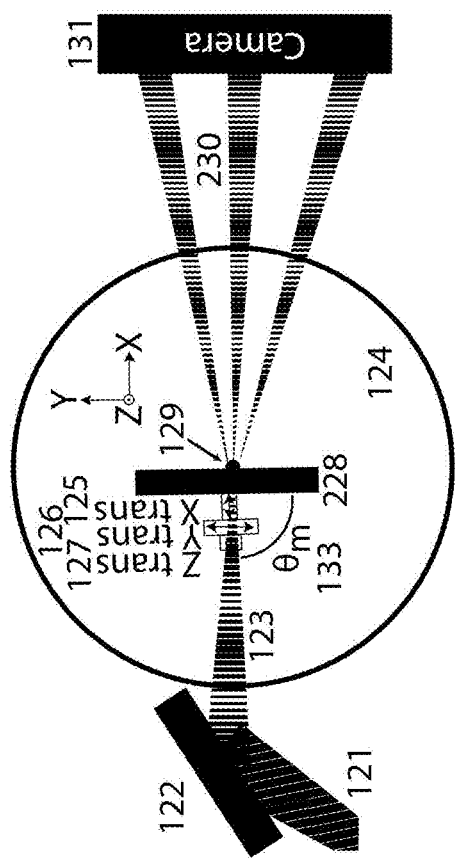
Figure 2C:
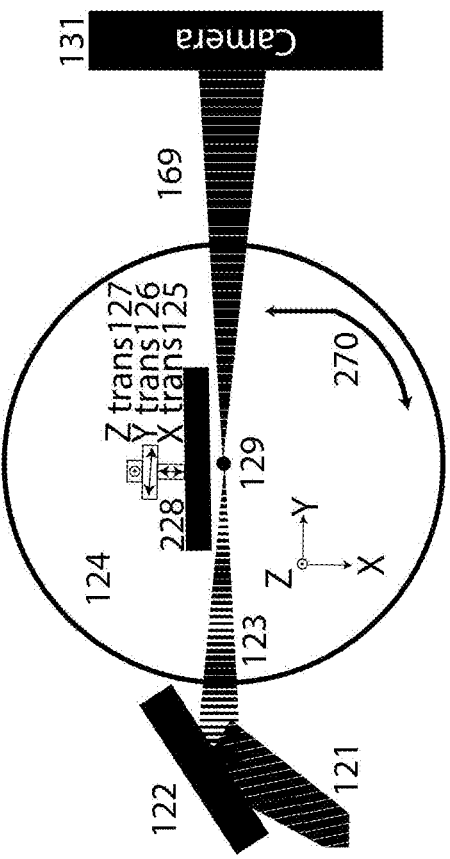

FIGS. 2A-C are schematic, top-down views of a complex imaging refractometer in various configurations according to the present invention.

The data collection methodology is similar to the case of the reflectometer shown in FIGS. 1A-C. In this case, sample 228 is partially transmissive to the radiation of incident beam 123. Camera 131 is placed perpendicular to the incident focusing beam 133.

In the reflection geometry of FIGS. 1A-C, sample 128 is mounted on a rotation stage 124 whose axis of rotation is the Z axis. The camera is mounted on a separate out-of-plane camera rotation stage 131 whose axis of rotation 129 is closely aligned to that of sample rotation stage 124. For the embodiment in which the independent parameter is incidence angle, the rotation stages 124, 132 are used to collect scatter patterns at a variety of incidence angles 133, 143 of the illumination, with (in the embodiment of FIG. 1B) camera 131 moving through twice the angle 145 of the sample at each imaging position such that the specular reflection from the sample is always pointed at the center of the camera.

In the transmission geometry of FIGS. 2A-C, sample 228 is still rotated to collect data at various incident angles 143, but camera 131 may remain stationary because the undiffracted, transmitted beam 230 is not deflected. At each incidence angle 143, either one diffraction pattern may be collected or the sample may be area-by-area scanned in-plane (using Y translation stage 126 and Z translation stage 127) with overlap between positions, resulting in a dataset for each incidence angle 143 that may be reconstructed using ptychographic coherent diffraction imaging.

FIG. 2A is the transmissive analogous configuration to the configuration of FIG. 1A. Again, input beam 121 is focused by optic 122, resulting in incident beam 123 at initial incident angle 133. Scattered light 230 is incident on camera 131, which collects scatter data 300 (see FIG. 3). In FIG. 2B, incident angle 143 is varied increments dθ and scatter data is collected. In FIG. 2C, sample 228 is removed from the path between optic 122 and camera 131, and unscattered beam data 169 is gathered directly.

For a sample that is both partially reflecting and partially transmitting, collecting scatter data in both transmission and reflection geometries can be useful, and the reconstruction of both complex reflectance and transmittance images can be useful. A way to collect both is by rotating camera 131 from the reflected side of the sample to the transmitted side between variations of the independent parameter.

The sub-VUV wavelength light 121 described above may be generated via high harmonic generation, or on a facility-scale source by a synchrotron or x-ray free electron laser. If a high harmonic source is used, one narrow-band harmonic may be selected using wavelength-selecting mirrors to illuminate the sample, in which case a reconstruction algorithm such as the extended ptychographic iterative engine (ePIE) may be used to perform phase retrieval. Alternatively, multiple harmonics may be used, illuminating the sample one at a time or all at once, in which case a reconstruction algorithm such as ptychographic information multiplexing (PIM) may be used to perform phase retrieval.

Regardless of the reconstruction algorithm, if coherent diffraction imaging (as opposed to holography or interferometric scanning point microscopy) is used, the power in the solved-for illumination at each wavelength should be constrained to be equal to the power in the beam incident on the sample. This may be achieved, for example, by summing the detector counts in an image of the beam obtained by reflecting the beam off a smooth mirror of known reflectivity, or by moving 270 the sample out of the way and moving detector 131 into the undiffracted beam, or by using the Modulus-Enforced Probe technique (shown and described in the patent application entitled "Modulus-Enforced Probe" filed concurrently with this application and having inventors Michael Tanksalvala, Daniel Adams, Dennis Gardner, Christina Porter and Giulia Mancini, and incorporated herein by reference). Alternatively, the incident beam's power may be measured by a calibrated photodiode. The detected scatter patterns must then be converted to the same units as the diode measurement using knowledge of the detector's quantum efficiency and the wavelength of the illumination.

If such normalization is performed properly, each reconstructed sample intensity image will naturally be equal to the reflectivity or transmissivity of the sample. This technique is called reconstructed absolute phase-diverse transmissivity or reflectivity CDI, or RAPTR CDI, and is described, for example, in Nano Letters 2016, 16 (9), pp 5444-5450. Furthermore, a beamsplitter and photodiode or second camera may be used to sample and monitor the power of the illumination simultaneously during data acquisition. This beamsplitter may be placed either before or after the focusing optic. There may be a diffraction grating placed in between the beamsplitter and the second camera to determine and monitor the spectral weights of wavelengths in the illumination if multiple wavelengths are being used. These measurements may be easily converted to detector counts so long as one undiffracted beam image is also collected on the detector measuring the scatter patterns (as shown in FIG. 1C, for reflection and FIG. 2C for transmission). The beam normalization described above may then be carried out on a per-position basis in the phase retrieval algorithms described previously. Monitoring the beam in this manner significantly decreases the sensitivity of the system to fluctuations in the incident beam's power.

In order to extend the spatial resolution (that is, the numerical aperture) of a spatially-resolved reflectometer or refractometer of the present invention, with the sample 128 or 228 held fixed, the camera 131 may be rotated such that the specular reflection (or the non-deflected transmitted beam) no longer points at the center of camera 131. By collecting diffraction patterns at a variety of camera rotations using rotation stage 124 (typically moving the camera through a small enough rotation at each step that there is overlap in the collected diffraction pattern with the previous step), high spatial frequency diffraction data is collected. These diffraction patterns may then be combined to produce a single, high-resolution diffraction pattern that extends to wavelength-limited spatial frequencies. The numerical aperture of the system may be extended in multiple dimensions if a third rotation stage that rotates the sample in the YZ plane about the X axis (with coordinates as shown in FIGS. 1A-2C) is used to rotate the sample in-plane. With the independent parameter held fixed, at each in-plane sample rotation position, camera 131 is also rotated. Then, all diffraction patterns from the various in-plane rotations and camera rotations may be stitched together to create a single, high numerical aperture diffraction pattern for a particular illumination incidence angle and sample translation. This procedure would then be carried out for each value of the independent parameter.

FIG. 3 is a flow diagram illustrating how scatter datasets (310, 320, 330) for various values of the independent parameter (collected as described above), may be used to obtain spatially resolved reflectance or transmittance vs. independent parameter curves (700). Each scatter dataset may consist of one or many scatter patterns (311, 321, 331) which may result, for example, from many relative translations or in-plane rotations of the sample.

The scatter datasets are reconstructed in step 400 using phase retrieval where the beam power is enforced using the beam data (302). This may include using ptychography, single diffraction pattern CDI, or holographic reconstruction techniques. In reconstruction step 400, beam data 302 is used as a normalization, ensuring that the reflectivity or transmissivity in the output images is an absolute measurement taking on a value between 0 and 1. Beam data 302 is collected, for example, as shown in FIG. 1C and FIG. 2C.

Reconstruction step 400 results in a complex image (510, 520, 530) for each of the values of the independent parameter. These complex images are represented as absolute reflectivity or transmissivity images (501) and phase images (502). In step 600, reflectance from individual pixels or groups of pixels corresponding to the same spatial location in each complex image (510, 520, 530) is plotted as a function of the independent parameter. The output of this step is shown in FIG. 700, and will hereafter be referred to as the measurement.

Spatial averaging may optionally be performed for pixels within regions of each image that have similar reflectances/transmittances. For example, in FIG. 3, all pixels in images 500 are divided into two categories: structures (540) and substrate (550).

Correspondingly, only reflectance/transmittance curves for the spatially averaged values of the structures and substrate are extracted in 700. The number of groups of pixels for which the reflectance/transmittance is measured (i.e. the amount of spatial averaging performed) may be much larger than two. In the limit, measurements 700 could consist of separate curves for every pixel in images 500. If a smaller amount of spatial averaging is performed, the spatial resolution of the ultimate sample composition measurement higher. If more spatial averaging is performed, the ultimate sample composition measurements will be more robust to noise, in general.

FIG. 4 is a flow diagram showing how the spatially-resolved reflectance/transmittance measurements in step 700 may be used to obtain the spatially-resolved, depth-dependent composition of the sample. For simplicity, FIGS. 3 and 4 show reflectance and in turn composition determined for only two categories of pixel in the reconstructed images (structures and substrate), but this determination of composition could be done for smaller groups of pixels or on a pixel-by-pixel basis instead. Based on prior knowledge of the sample, a population of guesses 800 for plausible composition vs. depth profiles of the sample are generated. Each guess consists of a separate composition vs. depth profile for every pixel group identified in 700 (for example, structures 540 and substrate 550).

In step 900, the interaction of the guessed sample compositions with sub-VUV wavelength light is modeled. This modeling may consist of representing each region of interest in the sample (i.e. structures 540 and substrate 550) as a stack of thin layers with differing refractive index per layer. Then, reflectance or transmittance vs. independent parameter curves are generated, for example by solving Maxwell's equations (or the Fresnel equations) in the stack. This is well done using a rigorous coupled-wave analysis (RCWA) computation. The result is a prediction of the sample's reflectance or transmittance 1000, for every value of the independent parameter, for every sample guess in population 800.

The predicted reflectance or transmittance curves are next compared in step 1100 to the measurement 700. An error metric such as the mean squared error is used to evaluate how close each prediction 1000 is to measurement 700. Next, a new population of possible samples is guessed in step 1200. The new guess population may be generated with a genetic algorithm. Such an algorithm typically eliminates guesses from the previous guess population 800 that produced predictions 1000 that were far from measurement 700, while keeping and/or combining guesses that yielded predictions 1000 close to measurement 700. Steps 800-1200 are iterated, refining the sample model until one of the sample guesses corresponds to a prediction 1000 for the reflectance/transmittance that agrees sufficiently well (1300) with measurement 700. Sufficiently well means, for example, that the error calculated in comparison 1100 falls below some pre-set threshold. Once step 1300 returns "true" (i.e. once agreement has been reached between the model and the measurement), the guessed sample composition that results in the lowest error between prediction 1000 and 700 is taken to be equal to the sample's composition. Once again, note that composition vs. depth profiles 1400 may be extracted pixel-by-pixel or for regions of the sample (i.e. structures 540 and substrate 550) known to have nearly-identical composition. Spatial averaging over many pixels of the image may increase composition sensitivity.

The result of the workflow of this patent is output 1400, a set of depth-dependent chemical concentrations for spatially-resolved regions of a sample. Accordingly, the technique can characterize in a spatially-resolved manner a variety of relevant quantities. These may include the sample's depth-dependent complex index of refraction, dopant concentrations, layer thicknesses, density, surface roughness, interfacial mixing (i.e. diffusion) at interfaces between layers, or dynamically changing compositions over time (including, but not limited to oxidation or other reactions as well as spin, thermal, or acoustic transportation).

While the exemplary preferred embodiments of the present invention are described herein with particularity, those skilled in the art will appreciate various changes, additions, and applications other than those specifically mentioned, which are within the spirit of this invention.

The invention claimed is:

1. The method of determining spatially-resolved material properties from a sample's complex reflectance or transmittance comprising the steps of:
   a. providing at least partially spatially-coherent radiation in the form of an incident beam;
   b. characterizing the incident beam;
   c. delivering the incident beam onto a sample to produce scattered radiation;
   d. varying at least one independent parameter of the incident beam upon which the sample's complex reflectance or transmittance is dependent;
   e. collecting the scattered radiation at multiple values of the independent parameter on a detector and generating scatter data;
   f. generating at least one spatially-resolved, complex image of the sample based upon the beam characterization and the collected scatter data, at each of the multiple values of the independent parameter, without constraining the complex images based on modeled electromagnetic scattering properties of the sample;
   g. calculating spatially-resolved complex scattering properties of the sample based on the images;
   h. determining spatially-resolved, depth-dependent material properties of the sample from the spatially-resolved complex scattering properties;
   i. guessing a population of at least one sample model in which spatially-resolved material properties are assigned a depth;

j. estimating predicted reflectance/transmittance versus the independent parameter based on the sample model;

k. comparing the predicted reflectance/transmittance versus the independent parameter to a calculated measurement of reflectance/transmittance versus the independent parameter; and l. refining the sample model until the discrepancy between the predicted reflectance/transmittance versus the independent parameter and the measured reflectance/transmittance versus the independent parameter is sufficiently small.

2. The method of claim 1 wherein the step of refining the sample model uses a genetic algorithm.

3. The method of claim 1 wherein step 1g uses either the amplitude or phase of the complex scattering properties.

4. The method of claim 1, wherein step 1h assigns at least one of the following to the spatially-varying depth profile:
dopant density;
material density;
material composition;
layer thickness;
surface roughness; or
interfacial mixing (diffusion) of interfaces between layers.

5. The method of claim 1 wherein step 1a provides vacuum ultraviolet (VUV) or deep UV or shorter wavelength light.

6. The method of claim 5, further including the step of generating the light via high harmonic generation.

7. The method of claim 1 wherein step 1a includes one of the following steps:
providing multiple illuminating wavelengths simultaneously incident on the sample;
providing multiple illuminating wavelengths in sequence incident on the sample;
providing multiple polarization states of the incident beam;
providing multiple spatial modes of the incident beam;
and wherein an independent parameter in step 1d includes one of the following:
radiation wavelength;
relative incidence angle between the beam and the sample;
radiation polarization;
shape of the incident beam.

8. The method of claim 1 further comprising the step of moving the sample relative to the incident beam and collecting the scattered radiation for multiple values of the independent parameter.

9. The method of claim 1 further comprising the step of moving the camera with respect to the scattered radiation to extend the resolution of the imaging system between variations of the independent parameter.

10. The method of claim 1 wherein step 1b includes the step of measuring beam power.

11. The method of claim 10 further including the step of repeatedly measuring the beam power during step 1e.

12. The method of claim 10 further comprising the step of removing the sample from the incident beam path while measuring beam power.

13. The method of claim 1 wherein step 1b includes the step of scattering the incident beam from a portion of the sample having known properties.

14. The method of claim 1 wherein step 1f further includes the step of using a ptychographic reconstruction algorithm.

15. Apparatus for measuring spatially-resolved material properties of a sample comprising:
an optic that focuses an incident beam of light composed of wavelengths at or below the vacuum ultraviolet onto the sample;
a detector configured to collect light that scatters from the sample and generate scatter data;
a device configured to measure power of the incident beam; and
a processor configured to convert scatter data and measured power of the incident beam into spatially-resolved, complex images of the sample, and determine spatially-resolved material properties of the sample from the spatially-resolved complex images without constraining the complex images based on modelled electromagnetic scattering properties of the sample; and
a mechanism for altering an independent parameter of the incident beam between spatially-resolved complex images.

16. The apparatus of claim 15 wherein the device includes an optic to divert a portion of the beam to the detector.

17. The apparatus of claim 15 further comprising at least one of the following:
a mechanism configured to rotate the sample relative to the incident beam;
a mechanism configured to translate the sample relative to the incident beam;
a mechanism configured to rotate the detector relative to the sample;
a mechanism for selectively removing the sample from a path of the beam between the optic and the detector.

18. The apparatus of claim 15 wherein the mechanism for altering alters the wavelength of the radiation on the sample.

* * * * *